United States Patent
Katiyar et al.

(10) Patent No.: US 7,366,682 B1
(45) Date of Patent: Apr. 29, 2008

(54) SYSTEM, METHOD, AND CODE FOR PROVIDING PROMOTIONS IN A NETWORK ENVIRONMENT

(75) Inventors: Dinesh Katiyar, Redwood City, CA (US); Eshwar Belani, San Jose, CA (US); Ujjwal Singh, San Francisco, CA (US); Su Chan, Sunnyvale, CA (US)

(73) Assignee: E.Piphany, Inc., San Mateo, CA (US)

( * ) Notice: Subject to any disclaimer, the term of this patent is extended or adjusted under 35 U.S.C. 154(b) by 0 days.

(21) Appl. No.: 09/566,202

(22) Filed: May 5, 2000

Related U.S. Application Data

(60) Provisional application No. 60/133,178, filed on May 7, 1999.

(51) Int. Cl.
*G06F 17/60* (2006.01)

(52) U.S. Cl. .............................. 705/14; 705/1; 705/10; 705/26; 707/10; 707/104

(58) Field of Classification Search ................. 705/14, 705/50, 1, 10, 26; 707/10, 104
See application file for complete search history.

(56) References Cited

U.S. PATENT DOCUMENTS

| | | | |
|---|---|---|---|
| 5,590,197 A * | 12/1996 | Chen et al. ................ | 705/65 |
| 5,706,442 A * | 1/1998 | Anderson et al. ............. | 705/27 |
| 5,715,453 A * | 2/1998 | Stewart ....................... | 715/513 |
| 5,870,724 A * | 2/1999 | Lawlor et al. ................ | 705/42 |
| 5,948,061 A * | 9/1999 | Merriman et al. ........... | 709/219 |
| 5,959,623 A * | 9/1999 | van Hoff et al. ............. | 345/719 |
| 5,999,914 A * | 12/1999 | Blinn et al. .................. | 705/26 |
| 6,009,410 A * | 12/1999 | LeMole et al. ................ | 705/14 |
| 6,014,638 A * | 1/2000 | Burge et al. .................. | 705/27 |
| 6,298,330 B1 * | 10/2001 | Gardenswartz et al. ....... | 705/14 |
| 6,311,185 B1 * | 10/2001 | Markowitz et al. ........... | 707/10 |
| 6,327,574 B1 * | 12/2001 | Kramer et al. ................ | 705/14 |
| 6,339,761 B1 * | 1/2002 | Cottingham .................. | 705/14 |
| 6,496,857 B1 * | 12/2002 | Dustin et al. ................ | 709/219 |
| 6,513,052 B1 * | 1/2003 | Binder ......................... | 707/204 |
| 6,516,338 B1 * | 2/2003 | Landsman et al. .......... | 709/203 |

(Continued)

OTHER PUBLICATIONS

White, Ron, How Computers Work, Millennium Ed. Que Corporation, Sep. 1999.*

(Continued)

*Primary Examiner*—Andrew J. Fischer
*Assistant Examiner*—John Winter
(74) *Attorney, Agent, or Firm*—Blank Rome LLP

(57) ABSTRACT

According to an embodiment of the present invention, techniques are disclosed for providing promotions to users of communication networks, such as the Internet. Information related to a plurality of promotions, including promotions information and rules associated with the promotions, are stored at a promotions management system. The promotions management system receives a query from a vendor system requesting promotions to be shown to a user browsing a particular item at the web site of the vendor. The promotions management system responds to the query by determining a set of promotions to be presented to the user based on the information contained in the query, the information related to the promotions, and other information accessible to the promotions management system. The promotions in the set of promotions are then presented to the user.

23 Claims, 6 Drawing Sheets

U.S. PATENT DOCUMENTS

| | | | |
|---|---|---|---|
| 6,519,571 B1 * | 2/2003 | Guheen et al. | 705/14 |
| 6,567,850 B1 * | 5/2003 | Freishtat et al. | 709/224 |
| 6,684,249 B1 * | 1/2004 | Frerichs et al. | 709/225 |
| 6,785,421 B1 * | 8/2004 | Gindele et al. | 382/217 |
| 6,802,042 B2 * | 10/2004 | Rangan et al. | 715/501.1 |
| 6,832,215 B2 * | 12/2004 | Gauthier et al. | 707/1 |
| 6,848,542 B2 * | 2/2005 | Gailey et al. | 186/35 |

OTHER PUBLICATIONS

Derfler, Frank J. et al. How Networks Work, Millennium Ed., Que Corporation, Jan. 2000.*

Gralla, Preston, How the Internet Works, Millennium Ed., Que Corporation, Aug. 1999.*

White, Ron, How Computers Work, 4th Ed. Que Corporation, Sep. 1998.*

Muller, Nathan J., Desktop Encyclopedia of the Internet, Artech House, Inc., 1998.*

Borland's Paradox for Windows User's Guide, Borland International, Inc, 1994.*

Borland's ReportSmith for Windows User's Guide, Borland International, Inc, 1994.*

Riley, David D., Data Abstraction and Stucture, An Introduction to Computer Science II, Boyd and Fraser Publishing Company, 1987.*

Berry, Michael J. A., and Linoff, Gordon, Data Mining Techniques For Marketing, Sales, and Customer Support. John Wiley & Sons, Jul. 1997.*

Borland's Paradox for Windows User's Guide, Borland International, Inc, 1994.*

Borland's ReportSmith for Windows User's Guide, Borland International, Inc, 1994.*

Riley, David D., Data Abstraction and Structure, An Introduction to Computer Science II, Boyd and Fraser Publishing Company, 1987.*

Berry, Michael J. A., and Linoff, Gordon, Data Mining Techniques For Marketing, Sales, and Customer Support. John Wiley & Sons, Jul. 1997.*

* cited by examiner

SYSTEM, METHOD, AND CODE FOR PROVIDING PROMOTIONS IN A NETWORK ENVIRONMENT

CROSS-REFERENCES TO RELATED APPLICATIONS

This application claims priority from U.S. Provisional Patent Application No. 60/133,178, entitled "SYSTEM AND METHOD FOR CONDUCTING TRANSACTIONS," filed May 7, 1999, the entire disclosure of which is herein incorporated by reference for all purposes.

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the U.S. Patent and Trademark Office patent file or records, but otherwise reserves all copyright rights whatsoever.

APPENDICES

The following appendices are being filed with this application, the entire contents of which are herein incorporated by reference for all purposes:

Appendix A (7 pages)—Technology and Architecture;
Appendix B (44 pages)—System Architecture;
Appendix C (5 pages)—Architecture outline for leveraged commerce application;
Appendix D (2 pages)—Leveraged Commerce Document;
Appendix E (1 page)—Customer Auctioning/Meta-Market Document

BACKGROUND OF THE INVENTION

The present invention relates generally to the field of electronic commerce and more specifically to techniques for dynamically providing promotions to online shoppers for items viewed or browsed by the online shoppers.

Electronic commerce has emerged as a multi-billion dollar marketplace for both consumers and businesses in recent years. A wide variety of products and services can now be obtained or purchased by online shoppers via online transactions using communication networks, such as the Internet. The World Wide Web (the "Web") has further enabled users of the Internet to participate in commercial transactions from the comfort of their homes or offices. In the Web environment, information resources available via the Internet are typically stored in the form of hypertext documents called "web pages" which can be accessed by users of the Web. A web page may incorporate any combination of text, graphics, audio and video content, software programs, and other data. Web pages may also contain hypertext links to other web pages. Web pages are typically stored on computer systems, called web servers, coupled to the Internet. Each web page is uniquely identified by an address called a Uniform Resource Locator (URL) that enables users to access the web page.

Users typically access and view web pages using a program called a "web browser" which executes on a computer coupled to the Internet. Users typically access web pages by providing URL information to the browser, either directly or indirectly, and the browser responds by retrieving the corresponding web page(s) from the Internet. The retrieved web page may then be displayed on the user's computer. Examples of browsers include the Internet Explorer browser program provided by Microsoft Corporation, and the Netscape Navigator browser provided by Netscape Corporation, and others.

As a result of the blossoming electronic commerce industry, an increasing number of retailers are now using the Internet as a medium for selling products and services. Users or online shoppers may use a browser to access an online retailer's (or "etailer") web site, browse web pages stored by the web site for items (which may be goods or services) offered by the etailer, select items for purchase (for example, by placing an item in a shopping cart), enter into commercial transactions with the etailer, and even pay for the purchased items over the Internet.

Due to the rapid increase in the number of etailers transacting business over the Internet, the success or failure of an individual etailer generally depends on the etailer's ability to acquire and retain customers online at viable costs. However, one of the biggest concerns nagging etailers today is the high cost associated with online customer acquisition. Presently, it is estimated that on the average only 5% of all users visiting a web site select items for purchase, and only about 1-2% complete the purchase transaction. The aforementioned statistics clearly indicate that in order to be successful, etailers will have to significantly improve the customer acquisition percentages while reducing the costs associated with customer acquisition procedures. Additionally, while there are several etailers who sell complementary items, and who could benefit from sharing their customers, the tools to facilitate this cross-pollination of customers to increase profitability of the etailers are not presently available.

Thus, there is a need for techniques which allow etailers to acquire customers at sustainable costs. It is desirable that these techniques allow cross-pollination of customers to further improve profitability of the etailers.

SUMMARY OF THE INVENTION

According to an embodiment of the present invention, techniques are disclosed for providing promotions to users of communication networks, such as the Internet. By creating a network of etailers and users, embodiments of the present invention reduce online customer acquisition costs and facilitate transactions at etailers while allowing the etailers to improve their profitability from online transactions.

According to an embodiment of the present invention, information related to a plurality of promotions, including promotions information and rules associated with the promotions, are stored at a promotions management system. The promotions management system receives a query from a vendor system requesting promotions to be shown to a user browsing a particular item at the vendor's web site. The query may include information about the user, information about the item being browsed by the user, and other information which may be used by promotions management system to determine which promotions will be presented to the user. Upon receiving the query, promotions management system determines a set of promotions to be presented to the user based on information such as the information contained in the query, the promotions information, the rules associated with the promotions, and other information. The promotions in the set of promotions are then presented to the user.

According to another embodiment of the present invention, a promoter may associate rules with promotions. Rules allow promoters to target the promotions to selected users and vendors. Each rule is a conjunction of one or more constraints associated with a promotion. Each constraint specifies a condition on a attribute. The attribute may be related to users, the item being browsed by the user, the vendors, transaction information, context information, and the like.

According to an embodiment of the present invention, the information included in the query may include information related to the user, the item being browsed by the user, the vendor, transaction information, constraints configured by the vendor, context information, and other types of information. The user-related information includes information about various attributes of the user such as name of the user, address of the user, age of the user, profile information, and the like. The item information includes information about various attributes of the item being browsed by the user. Constraints configured by the vendor allow the vendor to control the types of promotions accepted by the vendor system for presentation to the user. The context information indicates the context in which the user is browsing the item, including information about the user's level of interest in the item. The transaction information includes information about the state of the transaction of the user.

According to an embodiment of the present invention, the promotions management system determines the set of promotions to be presented to the user based on the information included in the query, the promotions information, the rules associated with the promotions, and other user or vendor related information stored by the promotions management system or accessible to the promotions management system. In an embodiment, the promotions management system assigns match scores to the promotions based on the matching between the rules associated with the promotions and the other types of information. The promotions are prioritized based on the match scores and promotions with top or optimal scores are included in the set of promotions to be presented to the user.

According to an embodiment of the present invention, the promotions management system also stores bid information, configured by the promoters, for each promotion. In this embodiment, the promotions management system determines the set of promotions to be presented to the user based on the information included in the query, the promotions information, the rules associated with the promotions, the bid information associated with the promotions, and other user or vendor related information stored by the promotions management system or accessible to the promotions management system. The bid information is used by promotions management system to assign scores to the promotions based on the expected returns of the promotions to the providers of promotions management system.

According to an embodiment of the present invention, the promotions in the set of promotions are presented to the user in a inactivated form even before the user has purchased the item which triggered the promotions. When the promotions management system receives an indication that the user has purchased the item, the promotions are presented to the user in an activated form. The user may then select one or more activated promotions to be exercised.

According to an embodiment of the present invention, the promotions management system archives information related to interactions between the user, the vendors, the promoters, and the promotions management system. The promotions management system may use this archived information to generate a profile for a user. In an embodiment of the present invention, the promotions management system may generate a consolidated profile for the user by combining information from profiles for user maintained by the promoters and vendors, and profiles for the user generated by the promotions management system.

The foregoing, together with other features, embodiments, and advantages of the present invention, will become more apparent when referring to the following specification, claims, and accompanying drawings.

DESCRIPTION OF THE SPECIFIC EMBODIMENTS

According to an embodiment of the present invention, techniques are disclosed for providing promotions to users of communication networks, such as the Internet. By creating a network of etailers and users, embodiments of the present invention reduce online customer acquisition costs and facilitate transactions at etailers while allowing the etailers to improve their profitability from online transactions.

Figure 1:
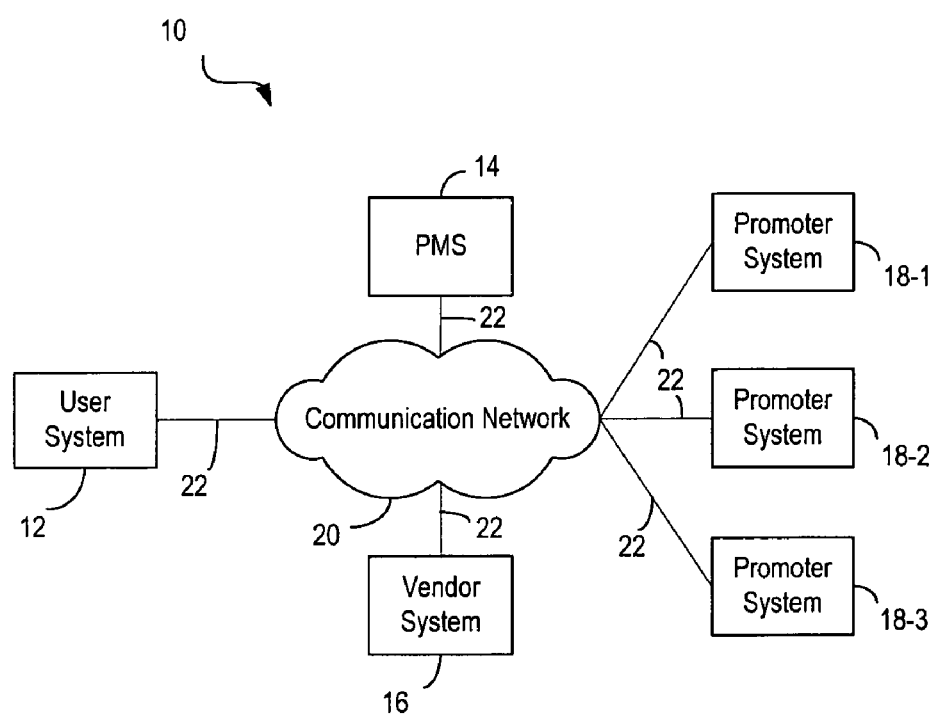
FIG. 1 is a simplified block diagram of a distributed computer network which may incorporate an embodiment of the present invention.

FIG. 1 is a simplified block diagram of a distributed computer network 10 which may incorporate an embodiment of the present invention. Computer network 10 includes a number of computer systems 12, 14, 16, 18-1, 18-2, and 18-3 coupled with a communication network 20 via a plurality of communication links 22. Communication network 20 provides a mechanism for allowing the various components of computer network 20 to communicate and exchange information with each other. Communication network 20 may itself be comprised of many interconnected computer systems and communication links. Communication links 22 may be hardwire links, optical links, satellite or other wireless communication links, wave propagation links, or any other mechanisms for communication of information. While in one embodiment, communication network 20 is the Internet, in other embodiments, communication network 20 may be any suitable computer network.

The computer systems depicted in FIG. 1 may include a user system 12, a vendor system 16, one or more promoter systems 18, and a promotions management system (PMS) 14. Distributed computer network 10 depicted in FIG. 1 is merely illustrative of an embodiment incorporating the present invention and does not limit the scope of the invention as recited in the claims. One of ordinary skill in the art would recognize other variations, modifications, and alternatives. For example, although only one user system 12 and one vendor system 16 are shown in FIG. 1, it should be apparent that a plurality of vendor systems and user systems may be coupled to communication network 20 according to other embodiments of the present invention.

Computer systems, such as those depicted in FIG. 1, may be characterized as "clients" or "servers" depending on the role the computer systems play with respect to requesting information or providing information. Client computers are computers that typically request information from a server computer which provides the information. Server systems are typically responsible for receiving information requests from client systems, performing processing required to satisfy the requests, and for forwarding the results corresponding to the information requests back to the requesting client systems. The processing required to satisfy the client request may be performed by a single server or may alternatively be delegated to other servers connected to communication network 20.

Figure 2:
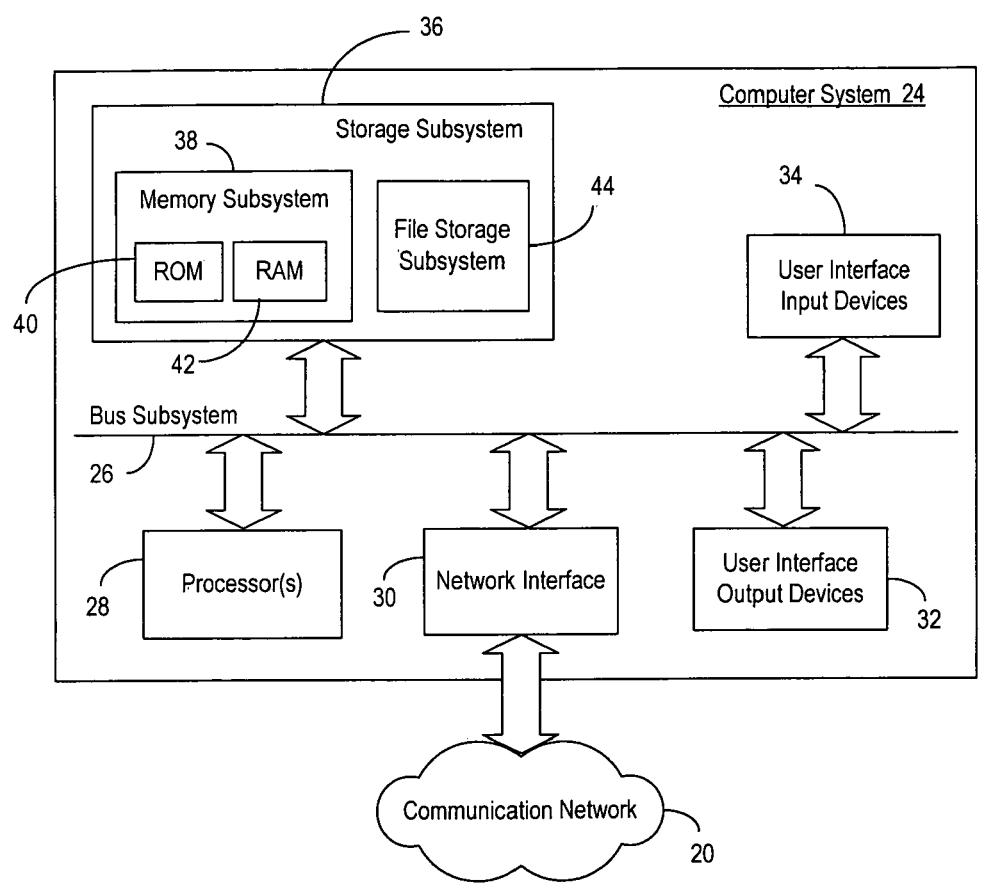
FIG. 2 is a simplified block diagram of an exemplary computer system according to an embodiment of the present invention.

FIG. 2 is a simplified block diagram of an exemplary computer system 24 according to an embodiment of the present invention. Computer system 24 may function as user system 12, PMS 14, vendor system 16, promoter system 18, or combinations thereof. Computer system 24 typically includes at least one processor 28 which communicates with a number of peripheral devices via a bus subsystem 26. These peripheral devices may include a storage subsystem 36, comprising a memory subsystem 38 and a file storage subsystem 44, user interface input devices 34, user interface output devices 32, and a network interface subsystem 30. The input and output devices allow users of computer system 24, for example, users, vendors, and promoters to interact with computer system 24. Network interface subsystem 30 provides an interface to outside networks, including an interface to communication network 20, and is coupled via communication network 20 to corresponding interface devices in other computer systems.

User interface input devices 34 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into computer system 24 or onto computer network 20

User interface output devices 32 may include a display subsystem, a printer, a fax machine, or non-visual displays such as audio output devices. The display subsystem may be a cathode ray tube (CRT), a flat-panel device such as a liquid crystal display (LCD), or a projection device. The display subsystem may also provide non-visual display such as via audio output devices. In general, use of the term "output device" is intended to include all possible types of devices and ways to output information from computer system 24 to a user or to another machine or computer system.

Storage subsystem 36 stores the basic programming and data constructs that provide the functionality of the various systems embodying the present invention. For example, databases and modules implementing the functionality of the present invention may be stored in storage subsystem 36. These software modules are generally executed by processor 28. In a distributed environment, the software modules may be stored on a plurality of computer systems and executed by processors of the plurality of computer systems. Storage subsystem 36 typically comprises memory subsystem 38 and file storage subsystem 44.

Memory subsystem 38 typically includes a number of memories including a main random access memory (RAM) 42 for storage of instructions and data during program execution and a read only memory (ROM) 40 in which fixed instructions are stored. File storage subsystem 44 provides persistent (non-volatile) storage for program and data files, and may include a hard disk drive, a floppy disk drive along with associated removable media, a Compact Digital Read Only Memory (CD-ROM) drive, an optical drive, or removable media cartridges. One or more of the drives may be located at remote locations on other connected computers at other sites coupled to communication network 20. The databases and modules implementing the functionality of the present invention may also be stored by file storage subsystem 44.

Bus subsystem 26 provides a mechanism for letting the various components and subsystems of computer system 24 communicate with each other as intended. The various subsystems and components of computer system 24 need not be at the same physical location but may be distributed at various locations within distributed network 10. Although bus subsystem 26 is shown schematically as a single bus, alternate embodiments of the bus subsystem may utilize multiple busses.

Computer system 24 itself can be of varying types including a personal computer, a portable computer, a workstation, a computer terminal, a network computer, a television, a mainframe, or any other data processing system. Due to the ever-changing nature of computers and networks, the description of computer system 24 depicted in FIG. 2 is intended only as a specific example for purposes of illustrating the preferred embodiment of the present invention. Many other configurations of computer system 24 are possible having more or less components than the computer system depicted in FIG. 2. Client computer systems and server computer systems generally have the same configuration as computer system 24 depicted in FIG. 2, with the server systems typically having more storage capacity and computing power than the client computer systems.

User system 12 enables a user to access various resources distributed within computer network 10 such as web pages stored by web sites of etailers. For example, a user may use user system 12 to perform activities such as browse web pages displaying items offered for sale by the etailers, select one or more items for purchase, complete commercial transactions pertaining to the purchase of the items, and other like activities.

According to the present invention, a user may use user system 12 to view promotions provided by promoting etailers (or promoters), select one or more promotions, and exercise the selected promotions. User system 12 also allows the user to interact with vendor system 16, PMS 14, and with promoter systems 18. For example, the user may access web pages stored by vendor system 16 via a browser executing on user system 12. The user may also use user system 12 to open accounts with PMS 14, check status of the accounts including status of promotions saved to the account or points accumulated to the account, provide user preferences/profile information to PMS 14, and to perform other like activities related to the present invention. User system 12 may also be used by the user to access web pages stored by promoter systems 18 in order to exercise promotions offered by the promoters.

Vendor system 16 and promoters systems 18 allow etailers (which may include vendors, promoters, and others) to interact with the present invention, enter into commercial transactions with a user, offer promotions to users, and other like activities. For purposes of this application, a vendor system refers to a computer system which hosts a vendor's web site which is initially accessed by a user via a browser executing on user system 12. The vendor web site hosted by vendor system 16 may store one or more web pages providing items, including products or services, offered for sale by the vendor. Vendor system 16 may be capable of handling commercial transactions entered into by a user upon purchase of one or more items offered for sale by the vendor web site.

Vendors may also use vendor system 16 to interact with PMS 14. The nature of these interactions may include opening of vendor accounts, checking the status of vendor accounts, receiving feedback from PMS 14 regarding commercial activities conducted by the user, providing information about the user to PMS 14, and other like activities.

According to the present invention, vendors open an account with PMS 14 to receive promotional information provided by PMS 14. As part of the vendor registration process, vendors may use vendor systems 16 to provide vendor related information to PMS 14. This information may include name of the vendor, web site location of the vendor, a vendor identification code (hereinafter "vendor id"), a password for security purposes, contact information for the vendor, contact information for the vendor's billing representative, subscription status of the vendor (for example, "gold" member, "platinum" member, etc.) which may qualify the vendor for favored treatment, categories of items sold by the vendor, approximate number of hits per day at the vendor site, and other like information. Upon receiving the vendor related information, PMS 14 validates the information, and upon successful validation opens a vendor account. In one embodiment of the present invention, PMS 14 determines if the vendor id uniquely identifies the vendor, and if not, a unique vendor id is assigned to the vendor by PMS 14. The vendor may then use the unique vendor id and a corresponding password to log into PMS 14 and access the vendor's account.

Promoter systems 18 enable promoters to interact with components of the present invention, and in particular with PMS 14. A promoter is typically an etailer who is interested in acquiring users while the users shop or browse web pages at a vendor's web site. A promoter system allows promoters to provide promotions related information to PMS 14, open promoter accounts with PMS 14, check status of the accounts, receive feedback from PMS 14 regarding commercial activities conducted by the user in regards to the promotions, and other like activities.

Promoters register and open an account with PMS 14 before they can avail themselves of services provided by the present invention. As part of the registration process, each promoter is prompted to provide promoter related information to PMS 14. The promoter related information may include name of the promoter, web site location of the promoter, a promoter identification code (hereinafter "promoter id"), a password for security purposes, contact information for the promoter, contact information for the promoter's billing representative, subscription status of the promoter (for example, "gold" member, "platinum" member, etc.) which may qualify the promoter for favored treatment, categories of items sold by the promoter, approximate number of hits per day at the promoter web site, and other like information. PMS 14 validates the information received from a promoter, and upon successful validation opens an account for the promoter. PMS 14 may also determine if the promoter id uniquely identifies the promoter, and if not a unique promoter id may be assigned to the promoter by PMS 14. The promoter may then use the unique promoter id and a corresponding password to log into PMS 14 and access the promoter's account.

According to an embodiment of the present invention, in order to attract users or acquire customers, promoters offer incentives to users via promotions which are presented to the users while the users browse/view web pages at the vendor's web site showing information about items offered for sale by the vendor. Examples of promotions include discounts offered by the promoters on items offered for sale by the promoters and which are complementary to the items browsed by the user at the vendor web site, and the like. These promotions not only provide an incentive for the user to purchase items offered for sale by the vendor but also provide an opportunity for the promoters to acquire customers and enter into transactions with the users. The present invention thus allows etailers, including vendors and promoters, to acquire customers online and to improve their revenue steam from online transactions.

According to an embodiment of the present invention, promotion information for each promotion may include information about the item being promoted, the price of the item as per the promotion, the savings to the user offered by the promotion, the duration of the promotion, and the like. According to an embodiment of the present invention, a promoter may associate a rule with each promotion. Rules allow promoters to target the promotions to selected audiences. For example, rules associated with promotions allow a promoter to identify the users to whom the promotions will be presented, the vendors who will display the promotions, the type of items with which the promotions will be associated, the context in which the promotions will be presented, and the like. PMS 14 uses the rules associated with promotions to determine which promotions will be presented to the user. In a specific embodiment of the present invention, each rule is a conjunction of one or more constraints. A constraint specifies a condition on an attribute. The attributes relate to characteristics of the item being viewed by the user, the user, the vendor, the transaction entered into by the user, etc. For example, attributes related to an item may include "item name," "item price," "manufacturer of the item," "category of the item," and the like. Likewise, examples of vendor related attributes include "vendor name," "vendor type," "amount traffic associated with the vendor's web site," "vendor web domain," and other like attributes. Similarly, examples of user related attributes include "user name," "gender of user," "age of the user," "address of the user," "profession of the user," "zip code of the user," and other user related attributes. Attributes specific to a category of items may also be defined. For example, if the item browsed by the user is a music CD, the category specific attributes may include "type of music", "music artist," "CD music company," "music genre," and the like.

Several types of conditions may be associated with an attribute. Table 1 lists examples of conditions which may be associated with attributes according to the present invention. It should be apparent that the examples listed in Table 1 are not intended to limit the scope of the present invention as recited in the claims. Various other attributes and conditions may also be used in conjunction with the present invention.

TABLE 1: Examples of attributes and associated conditions

| Attribute | Condition |
|---|---|
| Vendor.name | "starts with the letter 'C' and contains more than 4 characters" |
| User.name | "is Mr. Smith or Mr. Jones but not Mr. Wilson" |
| User.age | "must be more than 10 but must be less than 50" |
| User.address | "can include the string CA" |
| User.zipcode | "is 90210" |
| Item.price | "is less than $100 but greater than $5" |
| Item.name | "includes the string 'PALM'" |
| Item.category | "is books" |
| Item.manufacturer | "must be SONY" |

As previously stated, PMS 14 uses the rules associated with promotions to determine which promotions will be presented to the user. For example, if a promotion is associated with a rule which includes the constraint that "item.manufacturer must be SONY" (listed in Table 1), then that promotion may be selected by PMS 14 for display to the user only if the manufacturer of the item browsed by the user is SONY. PMS 14 thus dynamically determines which promotions will be presented to the user. The promotion will not be selected for any other item manufacturer.

In an embodiment of the present invention, promoters may also associate bid information with each promotion. The bid information indicates the amount of money that the promoter is willing to pay the providers of PMS 14 to provide the particular promotion to the user. This information is also used by PMS 14 to determine which promotions will be presented to the user, and allows PMS 14 to "auction" the user to the highest bidders. Information related to promotions, rules associated with the promotions, and bid information associated with the promotions (collectively referred to as "promotions related information") is configured by promoters and provided to PMS 14 which stores the information.

Promoter system 18 may also host a promoter's web site storing one or more web pages providing items, including items offered by the promoter as part of the promotions, offered for sale by the promoter. Promoter system 18 may also be configured to handle commercial transactions entered into by a user when the user selects and exercises one or more promotions offered by the promoter.

Promotions Management System (PMS) 14 performs a substantial portion of the processing required for providing promotions to users according to the teachings of the present invention. PMS 14 stores information related to the promotions, including promotions information, rules associated with the promotions, and bid information associated with the promotions, and uses the information to determine which promotions are to be displayed to users. PMS 14 also stores and manages promoter accounts and promoter related information, vendor accounts and vendor related information, and user accounts and user related information. PMS 14 also provides services allowing users, vendors, and promoters to log into their respective accounts and check or update the status of the accounts. Further details related to processing performed by PMS 14 and other components of the present invention are described below.

Figure 3:
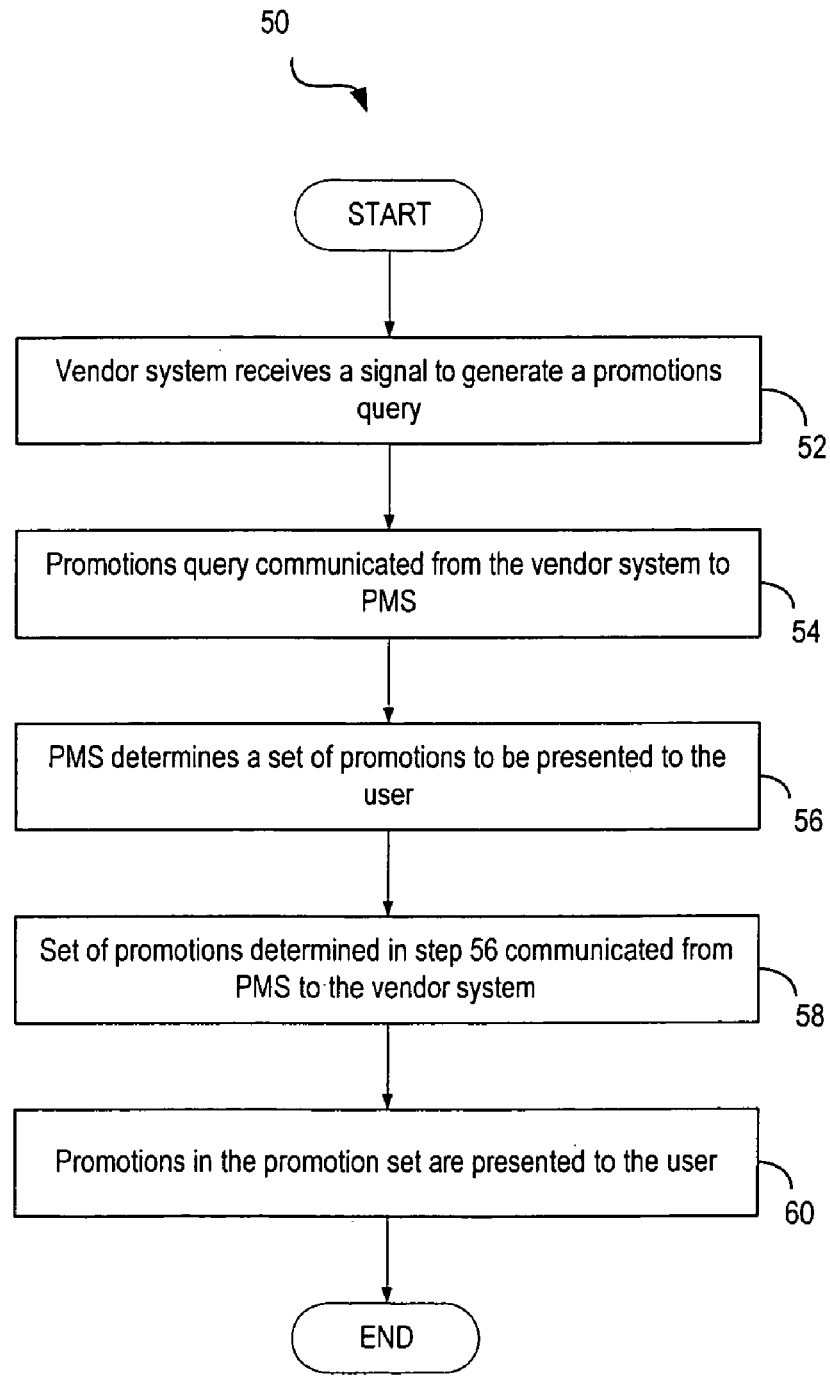
FIG. 3 is a simplified flowchart showing processing performed by the present invention for providing promotions information to a user according to an embodiment of the present invention.

FIG. 3 depicts a simplified flowchart 50 showing processing performed by the present invention for providing promotions to a user according to an embodiment of the present invention. The processing is generally initiated when a vendor system receives a signal to generate a query (hereinafter referred to as "promotions query") requesting information from PMS 14 about promotions to be presented to the user (step 52). In a specific embodiment of the present invention, vendor system 16 receives the signal when a user accesses a web page stored by the vendor's web site hosted by the vendor system. For example, the signal may be generated when a user, using a browser executing on user system 12, accesses a web page showing information about an item offered for sale by the vendor. In alternate embodiments, the signal may be generated when the user calls a call center of the vendor. The signal may also be generated by the vendor when the vendor decides to target the user for marketing programs.

The promotions query generated by vendor system 16 contains information which allows PMS 14 to determine which promotions offered by promoters and stored by PMS 14 will be presented to the user. Information included in the promotions query may include a promotions query identifier (hereinafter "promotions query id"), vendor information, user related information, information about the item viewed/browsed by the user, vendor constraints information, context information related to the user's activity, transaction information, and other types of information.

The promotions query id uniquely identifies a promotions query and is generated by vendor system 16. For example, in one embodiment of the present invention, a string of 64 characters may be used to store the promotions query id. As previously stated, the vendor id uniquely identifies the vendor whose web page is accessed by the user.

Vendor information may include information about the vendor such as the vendor id, name of the vendor, address of the vendor, and the like. In a specific embodiment, the vendor information contains the vendor id. PMS 14 then uses the vendor id to retrieve additional vendor related information such as the name of the vendor, address of the vendor, etc., stored by PMS 14.

The user information includes information about various attributes related to the user who is browsing the item. PMS 14 may use this information to select promotions which the user is more likely to be interested in. The user attributes may include attributes such as such as the name of the user, the user's address, the user's contact information, the user' email address, and the like. The user information may also include information related to demographic attributes of the user such as the age of the user, the user's gender, the user's title/role/designation, and the like. The user information may also include transactional information for the user such as information about the user's previous shopping history and information about the user's previous online transactions. For example, in a specific embodiment of the present invention, the user transaction information may indicate the category of items purchased by the user, the names of the items, the quantities of the items purchased by the user, the price of the items, the dates when the user performed the transactions, and the like.

The user information may also include profile information stored by vendor system 16 for the user. This information may be collected by vendor system 16 based on the user's interactions with vendor system 16, or based on profiling techniques, either explicit or implicit, used by vendor system 16 to gather the information. For example, a cookie residing on the user's system may provide information about the user to vendor system 16.

In an embodiment of the present invention where the user has an account with PMS 14, PMS 14 may itself store information related to the user. In this embodiment, the user information included in the promotions query may include a user id which may then be used by PMS 14 to retrieve additional user related information stored by PMS 14. PMS 14 may also employ various algorithms to infer information about the user and the user's online shopping habits.

The item information provides information about attributes of the item being viewed/browsed by the user, or an item in which the user has expressed an interest. The item related attributes may include the name of the item, the manufacturer or provider of the item, the category of the item, the price of the item, and the like. Depending upon the category of the item, the item information may include information related to the specific item category. For example, if the item were a travel brochure, the category specific information may include the name of the travel brochure publication, name of the country(ies) described in the travel brochure, and the like. If the item were a music CD, the category specific information may include information about the type of music, the artist featured on the CD, the music company of the CD, the music genre, and the like.

The vendor constraints information allows vendors to control the type and number of promotions presented to the user. The vendor constraints information may include constraints, with each constraint specifying a condition on an attribute. The attributes may be related to characteristics of promoters and the promotions. For example, attributes related to a promoter may include "promoter name," "promoter web domain," and the like. Attributes related to the promotions may include "category of the item being promoted," "manufacturer of the item being promoted," and the like. Constraints may also be defined for attributes which are item category specific. As described above in relation to constraints associated with promotions, several types of conditions may be associated with the attributes.

As stated above, vendor constraints information allows a vendor to specify the type of promotions which will be accepted by the vendor and presented to the user. For example, a vendor does not want to show promotions including items sold by "COMPETITOR," the vendor may configure a constraint such as:

Attribute: promoter.name
Conditions: "must not be COMPETITOR"

This constraint implies that promotions offered by "COMPETITOR" will not be accepted by the vendor.

A vendor may specifically define vendor constraints for a promotions query, or may alternatively define default constraints. These default constraints may be stored by vendor system 16 or may alternatively be forwarded to PMS 14 for storage by PMS 14. If the constraints are stored on vendor system 16, the vendor system may be configured to combine the default constraints with every promotions query before the promotions query is communicated to PMS 14. If the constraints are stored on PMS 14, PMS 14 may be configured to combine the default constraints with every promotions query received from the particular vendor. If a constraint specifically indicated in the promotions query conflicts with a default constraint, vendor system 16 or PMS 14 may be configured to give precedence to the constraint which is specifically indicated in the promotions query. In this manner, the vendor may overwrite the default constraints.

The context information related to the user's activity indicates the context in which the user is browsing or viewing the item. The context information may indicate if the user's activities are being performed in a pre-purchase context or a post-purchase context. Based on the context, the context information may indicate the user's level of interest in the item. For example, in a pre-purchase context, the user's level of interest in the item may be classified as either "low," "high," or "about to buy the item." For example, if the user is viewing a particular item along with other items, it may indicate a low level of interest in the particular item. If however, the user is viewing the item all by itself, it may indicate a high level of interest in the item. Further, if the user has added the item to his/her purchase cart, this may indicate an "about to buy" interest in the item. Context information may also include other types of information such as the time of the day when the user is browsing the item, whether the user is browsing the item from an office environment or a home environment, the number of times the user has browsed the item, and other like information.

The transaction information includes information about the state of the transaction that the user is in. For example, the transaction information may indicate if the user is involved in a purchase transaction, a item return transaction, or the like. The transaction information may also include characteristics of the item involved in the transaction, for example, the item quantity selected by the user, etc.

The promotions query is then communicated from vendor system 16 to PMS 14 (step 54). PMS 14 then dynamically determines a set of promotions to be presented to the user (step 56). In a specific embodiment of the present invention, PMS 14 determines the set of promotions based on promotions related information stored by PMS 14 including promotions information, rules and bid information associated with promotions, and information contained in the promotions query.

PMS 14 may use various filtering or matching techniques and combinations of the techniques to determine the set of promotions. According to one technique, PMS 14 determines a subset of promotions which are eligible for presentation to the user by matching the rules associated with the promotions and the information, such as vendor information, item information, and user information, contained in the promotions query. Match scores may be assigned to the promotions based on the matching. The various types of constraints may be scored differently during the matching process. In one embodiment, PMS may assign positive scores to the constraints associated with a promotion when the constraints are satisfied and negative scores to the constraints when the constraints are not satisfied. The match score for the rule associated with the promotion is the sum of the positive and negative scores assigned to constraints included in the rule. PMS 14 may also determine the set of promotions based on matching the vendor configured constraints with information related to promoters and/or promotions.

According to another technique, PMS 14 may score the promotions based on expected returns provided by the promotions to the providers of PMS 14. The expected return of a promotion is the amount in dollars that providers of PMS 14 can hope to make by presenting the promotion to the user. According to this technique, criteria such as the bid information associated with the promotions, and the subscription status of the promoters may be used to determine the set of promotions. For example, promotions offered by promoters who pay a higher subscription fee to the providers of PMS 14 may be given preference over other promotions. The average return for a promotion may also be determined based on the previous performance of the promotion as tracked by PMS 14 in terms of click-throughs (e.g. user clicked on the promotion), follow-throughs (e.g. user exercised the promotion), and the like. Several other criteria such as the amount of commission received by providers of PMS 14 or/and the vendor, the amount of discounts received by the user, etc. may also be used to score the promotions.

Accordingly, several techniques such as those described above and combinations thereof may be used to determine the inclusion of one or more promotions in the promotions set to be presented to the user. PMS 14 prioritizes the promotions based on the scores associated with the promotions. In a specific embodiment, a particular promotion's total match score may be calculated by summing the match scores assigned by the various techniques. Typically, top scoring promotions or promotions with optimal match scores are included in the set of promotions.

PMS 14 then communicates the set of promotions determined in step 56 to vendor system 16 to be presented to the user (step 58). The promotions included in the promotions set received by vendor system 16 from PMS 14 are then dynamically presented to the user (step 60). According to an embodiment of the present invention, the promotions are generally presented to the user in a summarized form on a web page accessed by the user. For example, the promotions are presented to the user as URL links on the vendor's web page accessed by the user. The user may click on the URL links to get detailed information about the promotions. In a specific embodiment of the present invention, clicking the promotions URL redirects the user to the promoter's web site and displays a web page stored at the promoter's web site describing details about the promotion. In an alternate embodiment, the promotion details may be displayed in a new browser application which may be started on the user system. The promotions may also be presented to the user as GIF images, thumbnail images, logos, streaming video, audio signals, and the like on the vendor web pages. Various other distribution channels such as emails, flyers, newsletters, phone calls, etc. may also be used to present promotions information to the user.

In an alternate embodiment of the present invention, the set of promotions determined in step 56 may be sent directly from PMS 14 to user system 12. The promotions are then displayed on user system 12.

According to an embodiment of the present invention, the promotions are displayed to the user even before the user has purchased the item which triggered the promotions. These promotions are generally displayed to the user in an "inactive" state. This implies that the user cannot qualify for incentives provided by the promotions until the user has purchased the item which triggered the promotions. It should however be apparent that in other embodiments of the present invention, promotions may be presented to the user in an activated form even before the user has purchased the item which triggered the promotions.

Figure 4:
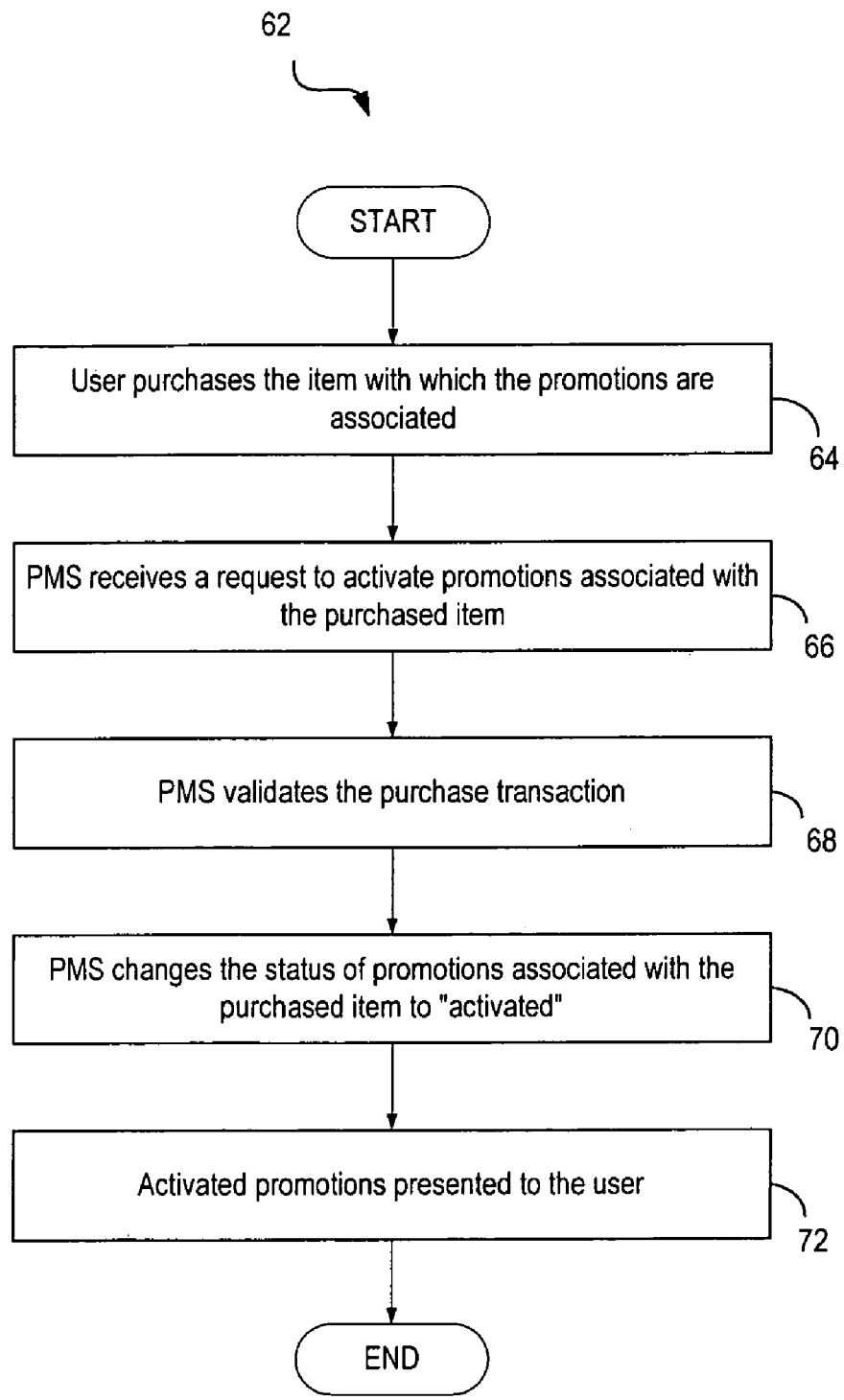
FIG. 4 is a simplified flowchart showing processing performed by the present invention for activating promotions according to an embodiment of the present invention.

FIG. 4 depicts a simplified flowchart 62 showing processing performed by the present invention for activating promotions according to an embodiment of the present invention. The promotions activation process is typically initiated when a user purchases the item with which the promotions were associated (step 64). In a specific embodiment of the present invention, this generally occurs when the user confirms the purchase transaction associated with the item. For example, a user may select a "Confirm" button displayed on a vendor web page confirming the purchase transaction of the item.

PMS 14 then receives a message to activate promotions associated with the purchased item (step 66). In an embodiment of the present invention, the activation request is received from vendor system 16. In an alternate embodiment of the present invention, the request may be received from user system 12. The message includes information required by PMS 14 to activate the promotions and may include information identifying the item, information identifying the promotions associated with the item purchased by the user, transaction information related to the user's purchase transaction, and other like information. The transaction information may include information about the item purchased by the user, the quantity of the purchased item, the price of the purchased item, and other like information. The purchasing user's profile information may also be communicated to PMS 14.

PMS 14 validates the purchase transaction based on information received from vendor system 16 in step 66 (step 68). PMS 14 also updates its local databases with information related to the transaction and the promotions to be activated. Upon successful validation, PMS 14 updates its local databases and changes the status of the promotions associated with the purchased item from "inactivated" to "activated" (step 70). This implies that the promotions are now available to be exercised by the user. An activation identification code (hereinafter "activation id") may also be assigned to each activated promotion. PMS 14 may also send messages to promoter systems 18 indicating activation of the promotions.

The activated promotions are then presented to the user (step 72). In a specific embodiment of the present invention, PMS 14 sends a message to vendor system 16 instructing vendor system 16 to present the activated promotions to the user. The message sent to vendor system 16 may also include information indicating the savings to the user if the user were to exercise the activated promotions, and the duration of the promotions. Vendor system 16 then presents the activated promotions to the user. For example, the activated promotions may be shown on a transaction confirmation page presented by the vendor site as part of the purchase transaction completion procedure. In an alternate embodiment of the present invention, the message may be sent directly from PMS 14 to user system 12. The user may access and view the activated promotions via user system 12.

The user may then either exercise an activated promotion or may save the activated promotions for future use. In a specific embodiment, the web page displaying the activated promotions may also provide an option to save the activated promotions. Upon selecting this option, the promotions are saved and stored in the user's account maintained by PMS 14. PMS 14 may prompt the user to enter the user's identification code ("user id") and an associated password before the promotions can be stored. Upon successful validation of the user id and password, the activated promotions are stored in the user's account. If the user does not have an account with PMS 14, the user may be prompted to open a new account with PMS 14. The activated promotions stored in the user's account may then be accessed by the user for later use.

After a promotion has been activated, the promotion's status, as stored by PMS 14, can be subsequently changed to one of several states including deactivated, invalid, used, and the like. A promotion may be marked as deactivated or invalid if the duration of the promotion has expired, if the user returns the item with which the promotion was associated, if the promoter decides to discontinue the promotion, or for other reasons.

Figure 5:
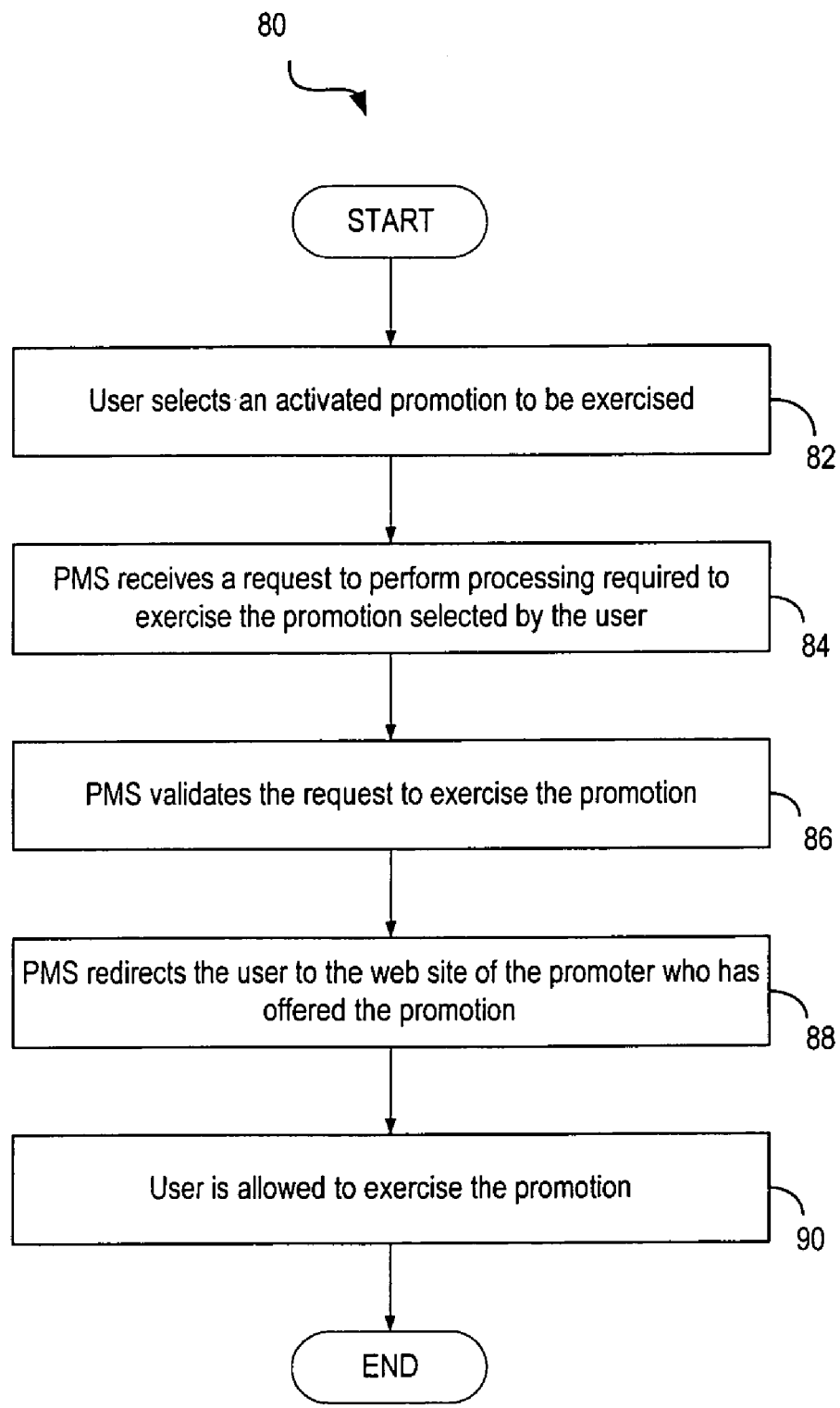
FIG. 5 is a simplified flowchart showing the processing performed by the present invention when a user executes or uses a promotion according to an embodiment of the present invention.

FIG. 5 depicts a simplified flowchart 80 showing the processing performed by the present invention when a user exercises a promotion according to an embodiment of the present invention. The processing is initiated when the user selects a particular activated promotion to be exercised (step 82). A user may generally accomplish this by clicking on an activated promotion. A user may elect to exercise a promotion in one of several contexts. In a first context, the user may elect to exercise a promotion by selecting an activated promotion link presented to the user on a web page stored at the vendor web site. In another context, the user may elect to exercise a promotion stored in the user's account maintained by PMS 14. In either context, a request is received by PMS 14 to perform processing required to exercise the promotion selected by the user (step 84). The request may include the user id of the user, the activation id of the selected promotion, the promoter's id, information about the item(s) identified in the promotion, and other information which facilitates exercising of the promotion.

Upon receiving a request to exercise a promotion, PMS 14 validates the information contained in the request (step 86). As part of this validation, PMS 14 determines the validity of the user, i.e. that the user is authorized to exercise the promotion. PMS 14 also determines that the promotion is valid. Validation of the promotion may include determining that the promotion is available to be exercised, or that the promotion is not inactivated, invalid or deactivated.

After successful validation, PMS 14 may then redirect the user to the web site of the promoter who has offered the promotion (step 88). In a specific embodiment of the present invention, the user's browser executing on user system 12 is redirected to the promoter's web site via a redirection URL displayed by the browser. The redirection URL may also contain the activation id of the promotion being exercised. Promoter system 18, hosting the promoter's web site may be configured to further validate the identity of the user and the availability of the promotion. Upon successful validation, promoter system 18 allows the user to exercise the promotion (step 90). In a specific embodiment, a web page may be presented to the user, via the user's browser, which allows the user to exercise the promotion. The promoter may send a message to PMS 14 informing PMS 14 that the promotion has been exercised. According to an embodiment of the present invention, the user may also be allocated a certain number of loyalty points for exercising one or more promotions. These loyalty points may be accumulated in the user's account maintained by PMS 14.

Figure 6:
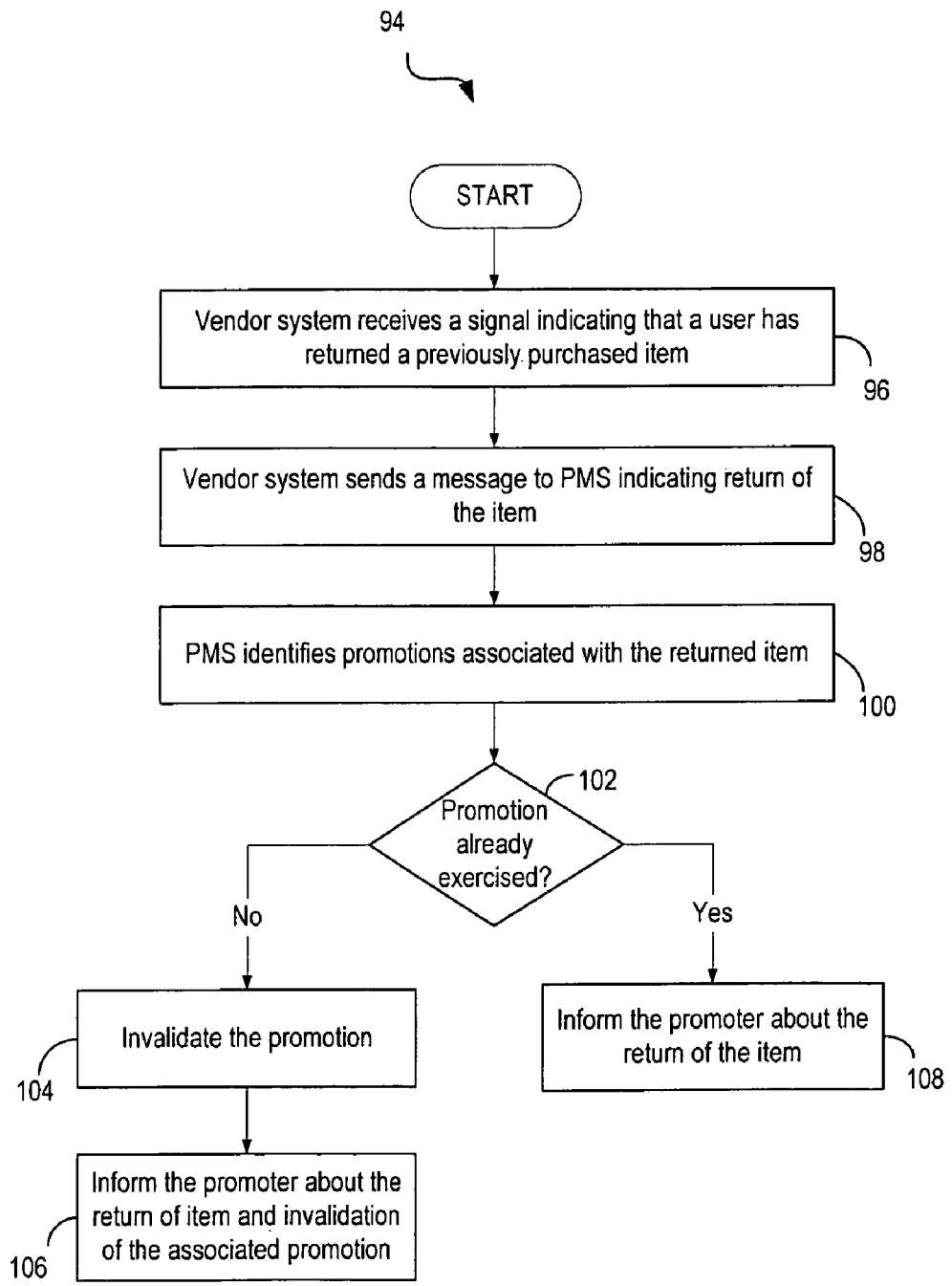
FIG. 6 is a simplified flowchart showing processing performed by the present invention when a user returns a previously purchased item according to an embodiment of the present invention.

FIG. 6 depicts a simplified flowchart 94 showing processing performed by the present invention when a user returns a previously purchased item according to an embodiment of the present invention. The processing is initiated when vendor system 16 receives a signal indicating that the user has returned an item which has previously triggered presentation of a set of promotions to the user (step 96). Vendor system 16 sends a message to PMS 14 indicating the return of the item (step 98). The message includes information which allows PMS 14 to identify the item being returned, identify the promotions associated with the item, identify the user returning the item, and identify the promoters who offered the promotions.

Upon receiving the item return request from vendor system 16, PMS 14 identifies all the promotions associated with the returned item (step 100). In one embodiment, for each promotion identified in step 100, PMS 14 determines if the promotion has already been exercised by the user (step 102). If the promotion has not been exercised, PMS 14 invalidates the promotion such that the promotion can no longer be exercised by the user (step 104). For example, PMS 14 may change the status of the promotion to "invalid" or "deactivated." PMS 14 may also optionally send a message to the corresponding promoter system 18 to inform the promoter of the invalidation of the promotion (step 106). If the promotion has already been exercised by the user, PMS 14 may send a message to the promoter informing the promoter that the item was returned (step 108).

In addition to the processing described above, according to an embodiment of the present invention, PMS 14 may also be configured to archive information related to interactions and activities conducted by the components of the present invention depicted in FIG. 1. PMS 14 may then use the archived information to generate analysis reports for promoters and vendors, build user profiles, mine a user's shopping behavior, prepare billing reports for vendors and promoters, and several other tasks. PMS 14 may also use the archived information to identify the best and most successful cross deals, i.e. the item and the promotions associated with the items. This information may be provided to users, vendors, and promoters.

According to an embodiment of the present invention, PMS 14 analyzes the archived information to generate an analysis report for the vendor showing how the vendor's business was affected by its participation in the promotion scheme of the present invention. For example, the report may provide information related to revenues generated by the vendor based on items sold by the vendor, revenues generated by the vendor via commissions generated from displaying the promotions, information about the best complementary promoters or complementary items, information about users' activities at the vendor web site, and other types of information. The report may be customized based on a plurality of criteria such as types of items sold by the vendors, categories of promoters who offered promotions associated with the vendor's items, etc. The vendor report may also indicate the amount of user activity in response to the promotions. For example, the report may indicate the number of impressions, click throughs, and follow throughs resulting from the promotions. The user activity information may also be shown for each vendor item category.

According to an embodiment of the present invention, PMS 14 may also be configured to analyze the archived information and generate reports for promoters who have registered to use services provided by PMS 14. The information contained in a promoter report may indicate how well each promotion offered by the promoter is performing, the best performing item categories or clusters of items for each promotion, vendors, items, or users best suited for a promotion, how a promoter is performing in comparison with other promoters using the services of PMS 14, and other types of information. The promoter report may also indicate the amount of user activity in response to the promotions. For example, the report may indicate the number of impressions, click throughs, and follow throughs resulting from the promotions. Promoters may use the information contained in the reports to decide upon the criteria for targeting the promotions.

According to an embodiment of the present invention, PMS 14 may also be configured to automatically generate and periodically provide billing information to vendors and promoters. According to a specific embodiment of the present invention, a vendor's bill may include two components: (1) the subscription fee the vendor pays to the providers of PMS 14 to be part of the promotions network provided by PMS 14; and (2) payments to the vendor payable by providers of PMS 14 relating to a user's activities originating at the vendor's web site. The amount payable to a vendor may depend on the billable actions performed by the user at the vendor site in response to promotions presented to the user. For example, when a user views a promotion, the vendor may be paid a percentage of the CPM (cost per thousand impressions) associated with the viewed promotion. If a user clicks on an activated promotion, the vendor may be paid a percentage of the CPC (cost per click) associated with the activated promotion. If a user exercises a promotion, the vendor may be paid a percentage of the CPS (cost per sale) associated with the sale of the item in the promotion, and a percentage of the CPL (fixed amount corresponding to a cost per lead). Additionally, a vendor's bill may list a breakup of the user's actions by categories of items such that the vendor can determine the increase in sales due to the promotions.

According to a specific embodiment of the present invention, a promoter's bill generated by PMS 14 may include two components: (1) the subscription fee the promoter pays to providers of PMS 14 to be part of the promotions scheme provided by PMS 14 and for displaying promoter sponsored promotions at the vendor web site; and (2) payments the promoter makes to providers of PMS 14 relating to a user's activities at the vendor's web site resulting from promotions displayed at the vendor web site. The amount payable by the promoter to the providers of PMS 14 may depend on the billable actions performed by the user at the vendor site in response to the promotions presented to the user. For example, when a user views a promotion, the providers of PMS 14 may be paid a percentage of the CPM (cost per thousand impressions) associated with the viewed promotion. If a user clicks on an activated promotion, the providers of PMS 14 may be paid a percentage of the CPC (cost per click) associated with the activated promotion. If a user exercises a promotion, the providers of PMS 14 may be paid a percentage of the CPS (cost per sale) associated with the sale of the item in the promotion, and a percentage of the CPL (fixed amount corresponding to a cost per lead).

According to an embodiment of the present invention, PMS 14 may also be configured to build profiles for users based on their interactions with the various computer systems depicted in FIG. 1. As previously stated, information related to the user's interactions are archived by PMS 14. PMS 14 may use the archived information along with other user related information, such as information gleaned from the user's account maintained by PMS 14, information about the user's purchase history or browsing activities, to build a user profile. In addition, PMS 14 may generate a consolidated profile for a user by combining information contained in the user profile generated by PMS 14 and information contained in user profiles for the same user maintained by the various vendors and promoters. Accordingly, the present invention provides techniques for collapsing multiple user profiles into one consolidated user profile which reflects the user's preferences and interests comprehensively.

As described above, PMS 14 determines the set of promotions to be presented to the user in an automatic and dynamic manner based on the "actual" behavior of the user rather than on the "perceived" interests of the user. This is because criteria such as the user's previous history are used to determine the set of promotions to be presented to the user. Further, the promotions are presented to the user before the actual purchase of the item by the user to entice the user to buy the item. Additionally, since the promotions are activated only after the user has purchased the item, it provides promoters with users who are more likely to exercise the promotions offered by the promoters and are thus more likely to become customers of the promoters. Thus, by using actual behavior targeting techniques, the present invention identifies users who are more likely to become customers as compared to users who are randomly surfing the Internet.

Further, since all the processing required to determine the set of promotions to be presented to the user is performed by PMS 14, the promoters and vendors are insulated from each other and thus do not even need to know about each other's presence. This is substantially different from conventional promotion/affiliate systems in which the vendors and promoters directly interface with each other and consequently the selection of promotions is based on static pre-determined agreements entered into by the vendors and promoters.

Further features of the present invention are described in Appendices A, B, C, D, and E, the entire contents of which are herein incorporated by reference for all purposes.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware or only in software or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. In a network environment comprising one or more first computer processing systems for a plurality of promoter systems, a second computer processing system including a vendor system, a third computer processing system including a promotions management system, and a fourth computer processing system including a user system, each computer processing system coupled to a communication network, a method of providing a set of promotions to a user when the user accesses a web page via the fourth computer processing system including the user system, the web page being stored at a vendor web site hosted by the second computer processing system including the vendor system and including information related to an item, the method comprising:

sending promotions information and rules associated with the promotions from the one or more first computer processing systems for the plurality of promoter systems to the third computer processing system over the communication network, the third computer processing system includes the promotions management system, wherein a rule associated with the promotions requires determination of the set of promotions based on price, name, category or manufacturer of the item available for purchase from the vendor system via the user system;

storing the promotions information and rules associated with a plurality of promotions at the third computer processing system including the promotions management system;

generating a promotions query at the second computer processing system including the vendor system for the item available for purchase from the vendor system via the user system, the promotions query including item-related information and user-related information;

communicating the promotions query from the second computer processing system including the vendor system to the third computer processing system including the promotions management system over the communication network;

determining at the third computer processing system including the promotions management system, in response to receiving the promotions query, the set of promotions for the item from the plurality of promotions based on the promotions query, and the promotions information and the rules associated with the promotions, by assigning a matching score to each promotion from the plurality of promotions based on the promotions query and user and vendor information and the rules associated with the plurality of promotions; prioritizing the plurality of promotions based on the matching scores and identifying the top scoring promotions to be included in the set of promotions;

communicating the set of promotions for the item from the third computer processing system including the promotions management system to the second computer processing system including the vendor system over the communication network; and providing the set of promotions for the item from the second computer processing system including the vendor system to the fourth computer processing system including the user system over the communication network.

2. The method of claim 1 wherein a rule associated with a promotion comprises at least one constraint specifying an attribute and a condition associated with the attribute.

3. The method of claim 1 wherein the promotions query includes a query identifier uniquely identifying the promotions query, and vendor identification information.

4. The method of claim 1 wherein generating the promotions query at the vendor system comprises:
determining the item-related information;
determining the user-related information;
determining context information indicating a context in which the user accesses the web page; and
including the item-related information, the user-related information, and the context information in the promotions query.

5. The method of claim 4 wherein the context information comprises information indicating the user's level of interest in the item.

6. The method of claim 1 wherein the promotions query includes promotions-related constraints, each promotions-related constraint including an attribute of the promotion and a condition associated with the attribute of the promotion.

7. The method of claim 1 wherein the promotions query includes promoter-related constraints, each promoter-related constraint including an attribute of a promoter and a condition associated with the attribute of the promoter.

8. The method of claim 1 wherein determining the set of promotions further comprises:
determining additional user and vendor related information based on the information included in the promotions query.

9. The method of claim 8 wherein prioritizing the plurality of promotions comprises assigning higher priorities to promotions which provide higher revenues to a provider of the promotions management system.

10. The method of claim 8 wherein prioritizing the plurality of promotions comprises:
receiving bid information for the plurality of promotions; and prioritizing the plurality of promotions based on the bid information.

11. The method of claim 1 wherein providing the set of promotions to the user comprises providing the set of promotions to the user before the user has purchased the item.

12. The method of claim 1 wherein providing the set of promotions to the user comprises displaying the set of promotions on the web page accessed by the user.

13. The method of claim 12 wherein the set of promotions are displayed on the web page as URL links.

14. The method of claim 12 wherein the set of promotions are displayed on the web page in an activated form.

15. The method of claim 12 wherein the set of promotions are displayed on the web page in an inactivated form.

16. The method of claim 15 further comprising:
receiving a first signal at the vendor system indicating purchase of the item by the user;
in response to the first signal, receiving a message at the promotions management system to activate the promotions included in the set of promotions;
activating the promotions included in the set of promotions at the promotions management system; and
providing the set of activated promotions to the user.

17. The method of claim 16 further comprising:
receiving a second signal at the promotions management system indicating selection of an activated promotion from the set of promotions by the user; and
in response to the second signal, directing the user to a web site hosted by a promoter system offering the activated promotion selected by the user.

18. The method of claim 17 further comprising
building a consolidated user profile for the user at the promotions management system based on user-related information accessible to the promotions management system and on user profiles stored by the vendor system and the promoter systems.

19. The method of claim 16 further comprising:
receiving a third signal at the promotions management system indicating that the user has returned the purchased item;
in response to the third signal, determining the set of promotions associated with the item; and
invalidating the promotions included in the set of promotions.

20. In a network environment comprising one or more first computer processing systems for a plurality of promoter systems, a second computer processing system including a vendor system, a third computer processing system including a promotions management system, and a fourth computer processing system including a user system, each computer processing system coupled to a communication network, a method of providing a set of promotions to a user when the user accesses a web page via the fourth computer processing system including the user system, the web page being stored at a vendor web site hosted by the second computer processing system including the vendor system and including information related to an item, the method comprising:
sending promotions information and rules associated with the promotions from the one or more first computer processing systems for the plurality of promoter systems to the third computer processing system over the communication network, the third computer processing system includes the promotions management system;

storing the promotions information and rules associated with a plurality of promotions at the third computer processing system including the promotions management system;

generating a promotions query at the second computer processing system including the vendor system for the item available for purchase from the vendor system via the user system, the promotions query including item-related information and user-related information;

communicating the promotions query from the second computer processing system including the vendor system to the third computer processing system including the promotions management system over the communication network;

determining at the third computer processing system including the promotions management system, in response to receiving the promotions query, the set of promotions for the item from the plurality of promotions based on the promotions query, and the promotions information and the rules associated with the promotions, by receiving constraint information from the vendor system, assigning a matching score to each promotion from the plurality of promotions based on the promotions query and user and vendor information and the rules associated with the plurality of promotions; determining additional user and vendor related information based on the information included in the promotions query; prioritizing the plurality of promotions based on the matching scores and identifying the top scoring promotions to be included in the set of promotions, wherein matching the information included in the promotions query and the additional user and vendor information with the promotions information and with the rules associated with the plurality of promotions comprises, for each promotion:
  assigning a first match score by matching the rule associated with the promotion, the information included in the promotions query, and the additional user and vendor related information;
  assigning a second match score based on an expected return provided by the promotion;
  assigning a third match score by matching the constraint information received from the vendor system with the promotions information and promoter information, the promoter information comprising information about promoters offering the plurality of promotions; and
  prioritizing the plurality of promotions based on the matching by generating a combined match score for each promotion based on the first match score, the second match score, and the third match score assigned to the promotion;

communicating the set of promotions for the item from the third computer processing system including the promotions management system to the second computer processing system including the vendor system over the communication network; and providing the set of promotions for the item from the second computer processing system including the vendor system to the fourth computer processing system including the user system over the communication network.

21. The method of claim 20 comprising storing bid information for the plurality of promotions at the third processing system including the promotions management system, and wherein assigning the second match score comprises assigning the second match score based on the bid information.

22. A computer-implemented method of providing a set of promotions to a user, the method comprising:
  receiving promotions information for a plurality of promotions and rules associated with the plurality of promotions;
  receiving vendor configured constraints;
  receiving a query including constraint information, information related to an item, and information about the user interested in purchasing the item;
  determining additional user and vendor related information based on the information included in the query;
  determining a set of promotions from the plurality of promotions based on the information contained in the query, the additional vendor and user related information, the promotions information, and the rules associated with the promotions; by:
    assigning a score to each promotion in the plurality of promotions based on the query, the promotions information, the additional user and vendor related information, and the rules associated with the promotions; wherein assigning the score to each promotion comprises, for each promotion:
      assigning a first match score by matching the rule associated with the promotion and the information included in the promotions query;
      assigning a second match score based on an expected return provided by the promotion;
      assigning a third match score by matching the vendor configured constraints with the promotions information; and
      assigning the score for the promotion based on the first match score, the second match score, and the third match score;
    determining a subset of promotions from the plurality of promotions based on the scores assigned to the promotions; and
    generating the set of promotions to include the subset of promotions;
  providing the set of promotions to the user;
  receiving a first signal indicating purchase of the item by the user;
  in response to the first signal, activating the promotions included in the set of promotions associated with the purchased item; and
  providing the set of activated promotions to the user.

23. The method of claim 22 further comprising
receiving bid information for the plurality of promotions, and wherein assigning the second match score comprises assigning the second match score based on the bid information for the promotion.

* * * * *